(12) United States Patent
Geng et al.

(10) Patent No.: US 12,157,472 B2
(45) Date of Patent: Dec. 3, 2024

(54) DRIVE SYSTEM FOR ENGINEERING VEHICLE, DRIVE METHOD, AND ENGINEERING VEHICLE

(71) Applicant: JIANGSU XCMG CONSTRUCTION MACHINERY RESEARCH INSTITUTE LTD., Jiangsu (CN)

(72) Inventors: Yanbo Geng, Jiangsu (CN); Penghui Zhou, Jiangsu (CN); Zeguo Zhang, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 0 days.

(21) Appl. No.: 18/034,915

(22) PCT Filed: Aug. 4, 2022

(86) PCT No.: PCT/CN2022/110221
§ 371 (c)(1),
(2) Date: May 2, 2023

(87) PCT Pub. No.: WO2024/011680
PCT Pub. Date: Jan. 18, 2024

(65) Prior Publication Data
US 2024/0336268 A1    Oct. 10, 2024

(30) Foreign Application Priority Data
Jul. 14, 2022   (CN) .......................... 202210826107.6

(51) Int. Cl.
*B60W 30/188*    (2012.01)
*B60K 17/354*    (2006.01)
(Continued)

(52) U.S. Cl.
CPC ......... *B60W 30/188* (2013.01); *B60K 17/354* (2013.01); *B60W 30/18172* (2013.01);
(Continued)

(58) Field of Classification Search
CPC .... F16H 2059/366; F16H 59/44; F16H 59/46; F16H 59/64; F16H 59/68; B60W 30/188;
(Continued)

(56) References Cited

U.S. PATENT DOCUMENTS 7,331,896 B1    2/2008  Kroppe
10,300,918 B2 *  5/2019  Grutter ................. B60K 23/08
(Continued)

FOREIGN PATENT DOCUMENTS

CN     204998368 U    1/2016
CN     107472082 A   12/2017
(Continued)

OTHER PUBLICATIONS

English translation of CN204998368U; http://translationportal.epo.org; Jul. 31, 2024 (Year: 2024).*
(Continued)

*Primary Examiner* — Roger L Pang
(74) *Attorney, Agent, or Firm* — Merchant & Gould P.C.

(57) ABSTRACT

The present disclosure relates to a drive system for an engineering vehicle, a drive method, and an engineering vehicle. The drive system for an engineering vehicle includes: front wheels, rear wheels, a drive device, a first drive axle, a second drive axle, a first pressure detection device, a first calculation device, a speed acquisition device, and a drive distribution device. The first drive axle is connected between the drive device and the front wheels, and the second drive axle is connected between the drive device and the rear wheels. The first pressure detection device is configured to detect a pressure load on the first
(Continued)

drive axle and a pressure load on the second drive axle, the first calculation device is configured to calculate a speed difference between the front wheels and the rear wheels, and the speed acquisition device is configured to acquire a running speed of the engineering vehicle. The drive distribution device is in signal connection with the first pressure detection device, the first calculation device, and the speed acquisition device. The drive distribution device is configured to adjust a drive mode of the drive system for an engineering vehicle according to the pressure load on the first drive axle, the pressure load on the second drive axle, the speed difference between the front wheels and the rear wheels, and the running speed.

15 Claims, 3 Drawing Sheets (51) Int. Cl.
   *B60W 30/18*   (2012.01)
   *B60W 30/182*  (2020.01)
   *B60W 10/119*  (2012.01)
(52) U.S. Cl.
   CPC ......... *B60W 30/182* (2013.01); *B60W 10/119* (2013.01); *B60W 2510/0638* (2013.01); *B60W 2510/1005* (2013.01); *B60W 2520/10* (2013.01); *B60W 2520/28* (2013.01); *B60W 2530/20* (2013.01); *B60W 2720/403* (2013.01)
(58) Field of Classification Search
   CPC ........... B60W 30/182; B60W 2520/10; B60W 2520/28; B60W 10/119; B60W 2720/403; B60W 30/18172; B60W 2510/0638; B60W 2510/1005; B60W 2530/20; B60K 17/354
   USPC .......................................................... 701/69
   See application file for complete search history.

(56) References Cited

U.S. PATENT DOCUMENTS

| 11,654,892 | B2* | 5/2023 | Oguro | B60W 30/18172 |
| | | | | 701/69 |
| 2024/0034299 | A1* | 2/2024 | Nelson | B60K 17/354 |
| 2024/0174080 | A1* | 5/2024 | Jutkowitz | B60K 23/0808 |

FOREIGN PATENT DOCUMENTS

| CN | 108216240 A | 6/2018 |
| CN | 110155009 A | 8/2019 |
| CN | 110843761 A | 2/2020 |
| EP | 2594445 A2 | 5/2013 |
| JP | 2001171378 A | 6/2001 |
| JP | 2010047185 A | 3/2010 |
| JP | 2010184615 A | 8/2010 |

OTHER PUBLICATIONS

English translation of JP2001171378A; http://translationportal.epo.org; Jul. 31, 2024 (Year: 2024).*
International Search Report for corresponding application for PCT/CN2022/110221 dated Apr. 23, 2023 (8 pages).
Chinese Office Action for corresponding CN Application No. 202210826107.6 issued on Apr. 20, 2023 (7 pages).

* cited by examiner

DRIVE SYSTEM FOR ENGINEERING VEHICLE, DRIVE METHOD, AND ENGINEERING VEHICLE

This application is a National Stage Application of International Application No. PCT/CN2022/110221, filed 4 Aug. 2022, which claims benefit of Serial No. 202210826107.6, filed 14 Jul. 2022 in China, and which applications are incorporated herein by reference. To the extent appropriate, a claim of priority is made to each of the above disclosed applications.

CROSS-REFERENCE TO RELATED APPLICATIONS

This application is based on and claims priority to Chinese Patent Application No. 202210826107.6, filed on Jul. 14, 2022, the contents of which are incorporated herein by reference in its entirety.

FIELD OF THE INVENTION

The present disclosure relates to the technical field of engineering machinery, and more particularly, to a drive system for an engineering vehicle, a drive method, and an engineering vehicle.

BACKGROUND OF THE INVENTION

Wheeled engineering vehicles have multiple functions of running and operation, the operation function of most of the wheeled engineering vehicles is assisted and realized by running, and the wheeled running may realize rapid transfer and load transport of the engineering vehicles, so performance and efficiency of running as a basic function of the wheeled engineering vehicles directly determine the quality of the engineering vehicles.

At present, mechanical transmission is still a first choice for design of wheeled engineering vehicles due to its advantages of high transmission efficiency, high precision, safety and reliability, and low overall cost.

Wheeled drive of engineering vehicles in related technologies mostly adopts mechanical transmission or hydraulic transmission. In order to obtain a larger tractive force, its drive form mostly adopts four-wheel drive. Some vehicles may manually select four-wheel/two-wheel drive. Although this type of drive form may ensure relatively good power performance, due to multiple working conditions of construction operation, load transport, no-load running, etc. of an engineering vehicle, there are diverse actual demands, and center-of-gravity positions and vehicle weights of the vehicle under different working conditions are very different, such that the engineering vehicle has various forms of states, and the demands for the multiple working conditions cannot be met by means of a fixed drive form. Manual selection of four-wheel/two-wheel drive is cumbersome in operation, and it is difficult to make an accurate and correct choice, resulting in relatively low running efficiency and fuel economy of the engineering vehicle.

It should be noted that information disclosed in the background of the present disclosure is only intended to improve understanding of the overall background of the present disclosure and should not be construed as admitting or implying in any form that the information constitutes the prior art already known to those skilled in the art.

SUMMARY OF THE INVENTION

Embodiments of the present disclosure provide a drive system for an engineering vehicle, a drive method, and an engineering vehicle. A drive mode may be adjusted in time according to a working condition of the engineering vehicle, thereby improving running efficiency and fuel economy of the vehicle.

According to a first aspect of the present disclosure, a drive system for an engineering vehicle is provided, which includes:
  front wheels;
  rear wheels;
  a drive device;
  a first drive axle, connected between the drive device and the front wheels;
  a second drive axle, connected between the drive device and the rear wheels;
  a first pressure detection device, configured to detect a pressure load on the first drive axle and a pressure load on the second drive axle;
  a first calculation device, configured to calculate a speed difference between the front wheels and the rear wheels;
  a speed acquisition device, configured to acquire a running speed of the engineering vehicle; and
  a drive distribution device, in signal connection with the first pressure detection device, the first calculation device, and the speed acquisition device, where the drive distribution device is configured to adjust a drive mode of the drive system for an engineering vehicle according to the pressure load on the first drive axle, the pressure load on the second drive axle, the speed difference between the front wheels and the rear wheels, and the running speed; and the drive mode comprises a front wheel drive mode, a rear wheel drive mode, and a simultaneous front and rear wheel drive mode.

In some embodiments, the drive system for an engineering vehicle further includes a second calculation device and a rotational speed detection device. The second calculation device is configured to calculate a tire rolling radius of the front wheels according to the pressure load on the first drive axle and a preset front wheel tire model and to calculate a tire rolling radius of the rear wheels according to the pressure load on the second drive axle and a preset rear wheel tire model. The rotational speed detection device is configured to detect a rotational speed of an output shaft of the drive device. The first calculation device is configured to calculate the speed difference between the front wheels and the rear wheels according to the tire rolling radius of the front wheels, the tire rolling radius of the rear wheels, and the rotational speed of the output shaft of the drive device.

In some embodiments, the drive system for an engineering vehicle further includes a second pressure detection device, a temperature detection device, and a model calibration device. The second pressure detection device is configured to detect a tire pressure of the front wheels and a tire pressure of the rear wheels. The temperature detection device is configured to detect a temperature of an environment where the front wheels and the rear wheels are located. The model calibration device is configured to calibrate the preset front wheel tire model and the preset rear wheel tire model according to the tire pressure of the front wheels and the tire pressure of the rear wheels, detected by the second pressure detection device, the pressure load on the first drive axle and the pressure load on the second drive axle, detected by the first pressure detection device, and the temperature of the environment where the front wheels and the rear wheels are located, detected by the temperature detection device after the engineering vehicle is started.

In some embodiments, the speed acquisition device is configured to acquire the running speed of the engineering vehicle according to the pressure load on the first drive axle, the pressure load on the second drive axle, a speed of the front wheels, a speed of the rear wheels, and the current drive mode of the engineering vehicle.

In some embodiments, the drive distribution device is configured to:
- in the case that the engineering vehicle is in a first running state, adjust the drive mode of the drive system for an engineering vehicle to the simultaneous front and rear wheel drive mode;
- in the case that the engineering vehicle is in a second running state, adjust the drive mode of the drive system for an engineering vehicle to the front wheel drive mode, the rear wheel drive mode, or the simultaneous front and rear wheel drive mode according to the speed difference between the front wheels and the rear wheels, the pressure load on the first drive axle, and the pressure load on the second drive axle;
- in the case that the engineering vehicle is in a third running state, adjust the drive mode of the drive system for an engineering vehicle to the front wheel drive mode or the rear wheel drive mode according to the pressure load on the first drive axle and the pressure load on the second drive axle; and
- in the case that the engineering vehicle is in a fourth running state, adjust the drive mode of the drive system for an engineering vehicle to the front wheel drive mode or the rear wheel drive mode according to the speed difference between the front wheels and the rear wheels;
- wherein the running speed of the engineering vehicle in the first running state<the running speed of the engineering vehicle in the second running state<the running speed of the engineering vehicle in the third running state<the running speed of the engineering vehicle in the fourth running state.

In some embodiments, the drive distribution device is configured to: in the case that the engineering vehicle is in the second running state;
- in the case that the running speed of the engineering vehicle is within a first running speed range, if the speed difference between the front wheels and the rear wheels is not greater than 2%, adjust the drive mode of the drive system for an engineering vehicle to the simultaneous front and rear wheel drive mode; and if the speed difference between the front wheels and the rear wheels is greater than 2%, adjust the drive mode of the drive system for an engineering vehicle to the front wheel drive mode or the rear wheel drive mode according to the pressure load on the first drive axle and the pressure load on the second drive axle; and
- in the case that the running speed of the engineering vehicle is within a second running speed range, if the speed difference between the front wheels and the rear wheels is greater than 2%, adjust the drive mode of the drive system for an engineering vehicle to the front wheel drive mode or the rear wheel drive mode according to the pressure load on the first drive axle and the pressure load on the second drive axle; if the speed difference between the front wheels and the rear wheels is 0-2%, adjust the drive mode of the drive system for an engineering vehicle to the simultaneous front and rear wheel drive mode; and if the speed difference between the front wheels and the rear wheels is less than 0, adjust the drive mode of the drive system for an engineering vehicle to the front wheel drive mode or the rear wheel drive mode according to the pressure load on the first drive axle and the pressure load on the second drive axle;
- wherein the speed in the first running speed range is greater than the speed in the second running speed range.

In some embodiments, in the case that the engineering vehicle is in the first running state, the running speed of the engineering vehicle is not greater than 3 km/h; in the case that the engineering vehicle is in the second running state, the first running speed range of the engineering vehicle is 3-6 km/h, and the second running speed range of the engineering vehicle is 6-10 km/h; in the case that the engineering vehicle is in the third running state, the running speed of the engineering vehicle is 10-22 km/h; and in the case that the engineering vehicle is in the fourth running state, the running speed of the engineering vehicle exceeds 22 km/h.

In some embodiments, the drive system for an engineering vehicle includes the two front wheels and the two rear wheels; in the front wheel drive mode, the two front wheels are in a drive state; in the rear wheel drive mode, the two rear wheels are in the drive state; and in the simultaneous front and rear wheel drive mode, both the two front wheels and the two rear wheels are in the drive state.

According to a second aspect of the present disclosure, an engineering vehicle is provided, including the aforementioned drive system for an engineering vehicle.

According to a third aspect of the present disclosure, there is provided a drive method based on the drive system for an engineering vehicle. The drive method includes:
- detecting a pressure load on a first drive axle and a pressure load on a second drive axle;
- calculating a speed difference between front wheels and rear wheels;
- acquiring a running speed of the engineering vehicle; and
- adjusting a drive mode of the drive system for an engineering vehicle according to the pressure load on the first drive axle, the pressure load on the second drive axle, the speed difference between the front wheels and the rear wheels, and the running speed, where the drive mode includes a front wheel drive mode, a rear wheel drive mode, and a simultaneous front and rear wheel drive mode.

In some embodiments, the calculating a speed difference between front wheels and rear wheels includes:
- providing a preset front wheel tire model and a preset rear wheel tire model;
- calculating a tire rolling radius of the front wheels according to the pressure load on the first drive axle and the preset front wheel tire model, and calculating a tire rolling radius of the rear wheels according to the pressure load on the second drive axle and the preset rear wheel tire model; and
- calculating the speed difference between the front wheels and the rear wheels according to the tire rolling radius of the front wheels, the tire rolling radius of the rear wheels, a transmission ratio of the first drive axle, and a transmission ratio of the second drive axle.

In some embodiments, after the engineering vehicle is started, and before the tire rolling radius of the front wheels is calculated according to the pressure load on the first drive axle and the preset front wheel tire model and the tire rolling radius of the rear wheels is calculated according to the pressure load on the second drive axle and the preset rear wheel tire model, the pressure load on the first drive axle, the pressure load on the second drive axle, a tire pressure of the front wheels, a tire pressure of the rear wheels, and a temperature of an environment where the front wheels and the rear wheels are located are detected first, and the preset front wheel tire model and the preset rear wheel tire model are calibrated according to a detection result.

In some embodiments, the acquiring a running speed of the engineering vehicle includes:

when the current drive mode of the engineering vehicle is the simultaneous front and rear wheel drive mode, if the pressure load on the first drive axle is greater than or equal to the pressure load on the second drive axle, taking the speed of the front wheels as the running speed of the engineering vehicle; and if the pressure load on the first drive axle is less than the pressure load on the second drive axle, taking the speed of the rear wheels as the running speed of the engineering vehicle;

when the current drive mode of the engineering vehicle is the front wheel drive mode, taking the speed of the front wheels as the running speed of the engineering vehicle; and when the current drive mode of the engineering vehicle is the rear wheel drive mode, taking the speed of the rear wheels as the running speed of the engineering vehicle.

In some embodiments, the adjusting a drive mode of the drive system for an engineering vehicle according to the pressure load on the first drive axle, the pressure load on the second drive axle, the speed difference between the front wheels and the rear wheels, and the running speed includes:

when the engineering vehicle is in a first running state, adjusting the drive mode of the drive system for an engineering vehicle to the simultaneous front and rear wheel drive mode;

when the engineering vehicle is in a second running state, adjusting the drive mode of the drive system for an engineering vehicle to the front wheel drive mode, the rear wheel drive mode, or the simultaneous front and rear wheel drive mode according to the speed difference between the front wheels and the rear wheels, the pressure load on the first drive axle, and the pressure load on the second drive axle;

when the engineering vehicle is in a third running state, adjusting the drive mode of the drive system for an engineering vehicle to the front wheel drive mode or the rear wheel drive mode according to the pressure load on the first drive axle and the pressure load on the second drive axle; and when the engineering vehicle is in a fourth running state, adjusting the drive mode of the drive system for an engineering vehicle to the front wheel drive mode or the rear wheel drive mode according to the speed difference between the front wheels and the rear wheels;

wherein the running speed of the engineering vehicle in the first running state<the running speed of the engineering vehicle in the second running state<the running speed of the engineering vehicle in the third running state<the running speed of the engineering vehicle in the fourth running state.

In some embodiments, when the engineering vehicle is in a second running state, the adjusting the drive mode of the drive system for an engineering vehicle to the front wheel drive mode, the rear wheel drive mode, or the simultaneous front and rear wheel drive mode according to the speed difference between the front wheels and the rear wheels, the pressure load on the first drive axle, and the pressure load on the second drive axle includes:

when the running speed of the engineering vehicle is within a first running speed range, if the speed difference between the front wheels and the rear wheels is not greater than 2%, adjusting the drive mode of the drive system for an engineering vehicle to the simultaneous front and rear wheel drive mode; and if the speed difference between the front wheels and the rear wheels is greater than 2%, adjusting the drive mode of the drive system for an engineering vehicle to the front wheel drive mode or the rear wheel drive mode according to the pressure load on the first drive axle and the pressure load on the second drive axle; and when the running speed of the engineering vehicle is within a second running speed range, if the speed difference between the front wheels and the rear wheels is greater than 2%, adjusting the drive mode of the drive system for an engineering vehicle to the front wheel drive mode or the rear wheel drive mode according to the pressure load on the first drive axle and the pressure load on the second drive axle; if the speed difference between the front wheels and the rear wheels is 0-2%, adjusting the drive mode of the drive system for an engineering vehicle to the simultaneous front and rear wheel drive mode; and if the speed difference between the front wheels and the rear wheels is less than 0, adjusting the drive mode of the drive system for an engineering vehicle to the front wheel drive mode or the rear wheel drive mode according to the pressure load on the first drive axle and the pressure load on the second drive axle;

wherein the speed in the first running speed range is greater than the speed in the second running speed range.

Based on the above technical solution, a drive distribution device in the embodiment of the present disclosure can adjust the drive mode of the drive system for an engineering vehicle according to real-time detected pressure load on a first drive axle, pressure load on a second drive axle, speed difference between front wheels and rear wheels, and running speed of the vehicle, such that the engineering vehicle may adjust the drive mode in time according to a real-time working condition, thereby improving the running efficiency and fuel economy of the vehicle.

Other features and advantages of the present disclosure will become apparent from the following detailed description of exemplary embodiments of the present disclosure with reference to accompanying drawings.

BRIEF DESCRIPTION OF THE DRAWINGS

To describe the technical solutions of the embodiments of the present disclosure or those of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

In the drawings.

1: front wheels; 2: rear wheels; 3: drive device; 31: engine; 32: gearbox; 33: controller; 4: first drive axle; 5: second drive axle; 6: first pressure detection device; 61: first pressure sensor; 62: second pressure sensor; 7: first calculation device; 71: front wheel speed calculation device; 72: rear wheel speed calculation device; 8: speed acquisition device; 9: drive distribution device; 10: second calculation device; 11: rotational speed detection device; 12: second pressure detection device; 121: third pressure sensor; 122: fourth pressure sensor; 13: temperature detection device; 14: model calibration device; 15: first transmission shaft; and 16: second transmission shaft.

DETAILED DESCRIPTION OF THE EMBODIMENTS

Technical solutions in the embodiments of the present disclosure will be described clearly and completely below with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the description of the present disclosure, it is to be understood that the orientations or positions represented by the terms of "center", "longitudinal", "transverse", "front", "back", "left", "right", "vertical", "horizontal", "top", "bottom", "inside", "outside", and the like are based on the accompanying figures, they are merely for ease of a description of the present disclosure and a simplified description instead of being intended to indicate or imply the apparatus or element to have a special orientation or to be configured and operated in a special orientation. Thus, they cannot be understood as limiting of the present disclosure.

After research, the inventor found that working conditions, mainly including spading loading and unloading, load transport, and no-load running, of an engineering vehicle, especially earth moving machinery as a typical representative, change frequently during working. An entire construction process often includes frequent switching of three working conditions. Center-of-gravity positions and vehicle weights of the vehicle are very different under the three working conditions, such that axle load distribution of the engineering vehicle and force deformation of tires fluctuate greatly. An excessive change in the axle load distribution of the vehicle directly affects a grip force of the tires. If the vehicle is driven in a fixed form, it will inevitably cause a great impact on power performance. Meanwhile, an excessive difference in the force deformation of the tires will seriously affects a linear speed of the tires, thereby causing a running speed difference between the tires, accelerating tire wear, increasing a running resistance of the vehicle, and greatly reducing running efficiency and product reliability.

Based on the above research, the inventor has improved a drive system for an engineering vehicle.

Figure 1:
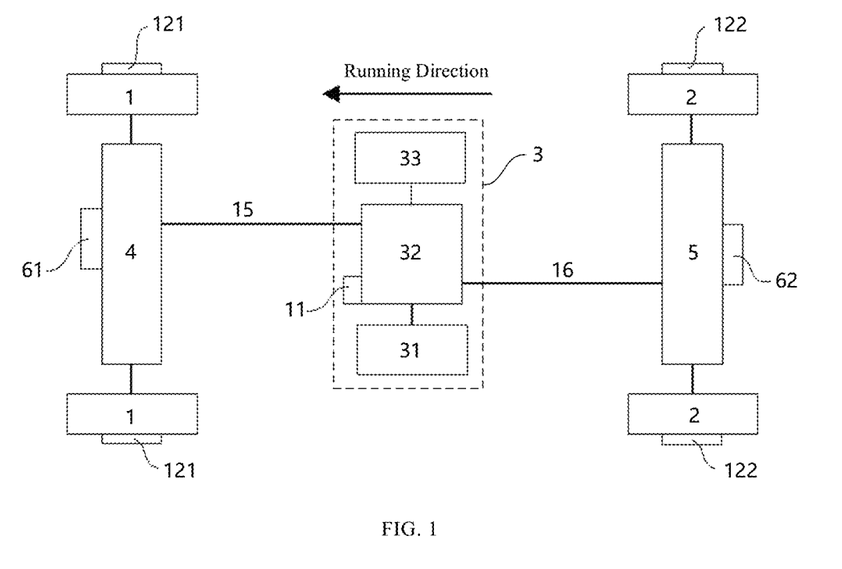
FIG. 1 is a schematic structural diagram of an embodiment of a drive system for an engineering vehicle in the present disclosure.
Figure 2:
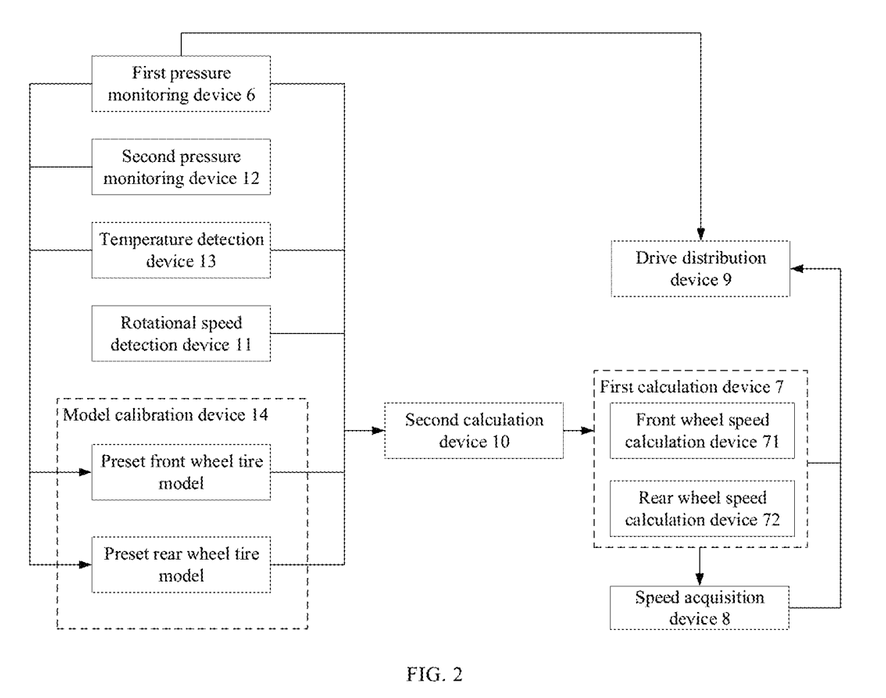
FIG. 2 is a schematic diagram of an embodiment of a drive system for an engineering vehicle in the present disclosure.

Referring to FIG. 1 and FIG. 2, in some embodiments of the drive system for an engineering vehicle provided by the present disclosure, the drive system includes: front wheels 1, rear wheels 2, a drive device 3, a first drive axle 4, a second drive axle 5, a first pressure detection device 6, a first calculation device 7, a speed acquisition device 8, and a drive distribution device 9. The first drive axle 4 is connected between the drive device 3 and the front wheels 1, and the second drive axle 5 is connected between the drive device 3 and the rear wheels 2. The first pressure detection device 6 is configured to detect a pressure load on the first drive axle 4 and a pressure load on the second drive axle 5, the first calculation device 7 is configured to calculate a speed difference between the front wheels 1 and the rear wheels 2, and the speed acquisition device 8 is configured to acquire a running speed of the engineering vehicle. The drive distribution device 9 is in signal connection with the first pressure detection device 6, the first calculation device 7, and the speed acquisition device 8. The drive distribution device 9 is configured to adjust a drive mode of the drive system for an engineering vehicle according to the pressure load on the first drive axle 4, the pressure load on the second drive axle 5, the speed difference between the front wheels 1 and the rear wheels 2, and the running speed. The drive mode includes a front wheel drive mode, a rear wheel drive mode, and a simultaneous front and rear wheel drive mode.

In the above embodiment, a drive distribution device 9 can adjust a drive mode of the drive system for an engineering vehicle according to real-time detected pressure load on a first drive axle 4, pressure load on a second drive axle 5, speed difference between front wheels 1 and rear wheels 2, and running speed of the vehicle, such that the engineering vehicle may adjust the drive mode in time according to a real-time working condition, thereby improving the running efficiency and fuel economy of the vehicle.

In the above embodiment, the drive mode of the drive system for an engineering vehicle includes a front wheel drive mode, a rear wheel drive mode, and a simultaneous front and rear wheel drive mode. In the front wheel drive mode, the front wheels 1 are in a drive state, and the rear wheels 2 are in a non-drive state; in the rear wheel drive mode, the front wheels 1 are in the non-drive state, and the rear wheels 2 are in the drive state; and in the simultaneous front and rear wheel drive mode, both the front wheels 1 and the rear wheels 2 are in the drive state.

By adjusting the drive mode of the drive system for an engineering vehicle, the drive mode may be matched with an operating condition of the vehicle to save energy and improve the fuel economy; and meanwhile, a drive capability of the vehicle may also be matched with a real-time operating condition to improve the running efficiency of the vehicle.

In some embodiments, the drive system for an engineering vehicle further includes a second calculation device 10 and a rotational speed detection device 11. The second calculation device 10 is configured to calculate a tire rolling radius of the front wheels 1 according to the pressure load on the first drive axle 4 and a preset front wheel tire model and to calculate a tire rolling radius of the rear wheels 2 according to the pressure load on the second drive axle 5 and a preset rear wheel tire model. The rotational speed detection device 11 is configured to detect a rotational speed of an output shaft of the drive device 3. The first calculation device 7 is configured to calculate the speed difference between the front wheels 1 and the rear wheels 2 according to the tire rolling radius of the front wheels 1, the tire rolling radius of the rear wheels 2, and the rotational speed of the output shaft of the drive device 3.

By arranging a second calculation device 10, a tire rolling radius of the front wheels 1 may be calculated according to the pressure load on the first drive axle 4 and a preset front wheel tire model, a tire rolling radius of the rear wheels 2 may be calculated according to the pressure load on the second drive axle 5 and a preset rear wheel tire model, and then the speed difference between the front wheels 1 and the rear wheels 2 is calculated by a first calculation device 7 according to the tire rolling radius of the front wheels 1, the tire rolling radius of the rear wheels 2, and a rotational speed of an output shaft of a drive device 3, detected by a rotational speed detection device 11.

In some embodiments, the first calculation device 7 calculates the speed difference between the front wheels 1 and the rear wheels 2 according to the tire rolling radius of the front wheels 1, the tire rolling radius of the rear wheels 2, a transmission ratio between the drive device 3 and the first drive axle 4, a transmission ratio between the drive device 3 and the second drive axles 5, and the rotational speed of the output shaft of the drive device 3.

As shown in FIG. 2, in some embodiments, the first calculation device 7 includes a front wheel speed calculation device 71 and a rear wheel speed calculation device 72. Before the first calculation device 7 calculates the speed difference between the front wheels 1 and the rear wheels 2, a speed of the front wheels 1 and a speed of the rear wheels 2 may be calculated by the front wheel speed calculation device 71 and the rear wheel speed calculation device 72, respectively.

In the embodiment of the present disclosure, the preset front wheel tire model and the preset rear wheel tire model may be same or different in form.

In some embodiments, the preset front wheel tire model and the preset rear wheel tire model may be in the form of a two-dimensional table. For example, the two-dimensional table may include three parameters, namely, pressure loads, tire pressures, and tire temperatures of the tires under running conditions, obtained by countless bench tests in advance. State coefficients of the tires may be queried according to the two-dimensional table of the bearing parameters of the tires. For example, the tire rolling radius of the front wheels 1 and the tire rolling radius of the rear wheels 2 may be queried or calculated according to the real-time detected pressure load on the first drive axle 4 and pressure load on the second drive axle 5.

In some embodiments, the drive system for an engineering vehicle further includes a second pressure detection device 12, a temperature detection device 13, and a model calibration device 14. The second pressure detection device 12 is configured to detect a tire pressure of the front wheels 1 and a tire pressure of the rear wheels 2. The temperature detection device 13 is configured to detect a temperature of an environment where the front wheels 1 and the rear wheels 2 are located. The model calibration device 14 is configured to calibrate the preset front wheel tire model and the preset rear wheel tire model according to the tire pressure of the front wheels 1 and the tire pressure of the rear wheels 2, detected by the second pressure detection device 12, the pressure load on the first drive axle 4 and the pressure load on the second drive axle 5, detected by the first pressure detection device 6, and the temperature of the environment where the front wheels 1 and the rear wheels 2 are located, detected by the temperature detection device 13 after the engineering vehicle is started.

The preset front wheel tire model and the preset rear wheel tire model may be calibrated through the real-time detected tire pressure of the front wheels 1, tire pressure of the rear wheels 2, pressure load on the first drive axle 4, pressure load on the second drive axle 5, and temperature of an environment where the front wheels 1 and the rear wheels 2 are located, detected by a temperature detection device 13 to improve accuracy of the tire parameters obtained by querying the preset front wheel tire model and the preset rear wheel tire model subsequently.

In some embodiments, the speed acquisition device 8 is configured to acquire the running speed of the engineering vehicle according to the pressure load on the first drive axle 4, the pressure load on the second drive axle 5, a speed of the front wheels 1, a speed of the rear wheels 2, and the current drive mode of the engineering vehicle.

Compared with a solution to directly acquire a running speed of the engineering vehicle from a speed detection module, configuring a speed acquisition device 8 to acquire the running speed of the engineering vehicle according to the pressure load on the first drive axle 4, the pressure load on the second drive axle 5, the speed of the front wheels 1, the speed of the rear wheels 2, and the current drive mode of the engineering vehicle may effectively improve accuracy and real-time performance of the running speed of the engineering vehicle.

In some embodiments, the drive distribution device 9 is configured to:
  in the case that the engineering vehicle is in a first running state, adjust the drive mode of the drive system for an engineering vehicle to the simultaneous front and rear wheel drive mode;
  in the case that the engineering vehicle is in a second running state, adjust the drive mode of the drive system for an engineering vehicle to the front wheel drive mode, the rear wheel drive mode, or the simultaneous front and rear wheel drive mode according to the speed difference between the front wheels and the rear wheels, the pressure load on the first drive axle, and the pressure load on the second drive axle;
  in the case that the engineering vehicle is in a third running state, adjust the drive mode of the drive system for an engineering vehicle to the front wheel drive mode or the rear wheel drive mode according to the pressure load on the first drive axle and the pressure load on the second drive axle; and
  in the case that the engineering vehicle is in a fourth running state, adjust the drive mode of the drive system for an engineering vehicle to the front wheel drive mode or the rear wheel drive mode according to the speed difference between the front wheels and the rear wheels;
  wherein the running speed of the engineering vehicle in the first running state<the running speed of the engineering vehicle in the second running state<the running speed of the engineering vehicle in the third running state<the running speed of the engineering vehicle in the fourth running state.

By dividing the running speed of the engineering vehicle into a plurality of different running states, different adjustment strategies for the drive mode may be adopted according to operating conditions of the vehicle at different speeds to achieve match between power and demands as much as possible, thereby effectively improving the running efficiency and fuel economy of the vehicle.

In some embodiments, the drive distribution device 9 is configured to: in the case that the engineering vehicle is in the second running state:
  in the case that the running speed of the engineering vehicle is within a first running speed range, if the speed difference between the front wheels and the rear wheels is not greater than 2%, adjust the drive mode of the drive system for an engineering vehicle to the simultaneous front and rear wheel drive mode; and if the speed difference between the front wheels and the rear wheels is greater than 2%, adjust the drive mode of the drive system for an engineering vehicle to the front wheel drive mode or the rear wheel drive mode according to the pressure load on the first drive axle and the pressure load on the second drive axle; and in the case that the running speed of the engineering vehicle is within a second running speed range, if the speed difference between the front wheels and the rear wheels is greater than 2%, adjust the drive mode of the drive system for an engineering vehicle to the front wheel drive mode or the rear wheel drive mode according to the pressure load on the first drive axle and the pressure load on the second drive axle; if the speed difference between the front wheels and the rear wheels is 0-2%, adjust the drive mode of the drive system for an engineering vehicle to the simultaneous front and rear wheel drive mode; and if the speed difference between the front wheels and the rear wheels is less than 0, adjust the drive mode of the drive system for an engineering vehicle to the front wheel drive mode or the rear wheel drive mode according to the pressure load on the first drive axle and the pressure load on the second drive axle;

wherein the speed in the first running speed range is greater than the speed in the second running speed range.

In some embodiments, in the case that the engineering vehicle is in the first running state, the running speed of the engineering vehicle is not greater than 3 km/h; in the case that the engineering vehicle is in the second running state, the first running speed range of the engineering vehicle is 3-6 km/h, and the second running speed range of the engineering vehicle is 6-10 km/h; in the case that the engineering vehicle is in the third running state, the running speed of the engineering vehicle is 10-22 km/h; and in the case that the engineering vehicle is in the fourth running state, the running speed of the engineering vehicle exceeds 22 km/h.

In some embodiments, the drive system for an engineering vehicle includes the two front wheels 1 and the two rear wheels 2; in the front wheel drive mode, the two front wheels 1 are in a drive state, and the two rear wheels 2 are in a non-drive state; in the rear wheel drive mode, the two front wheels 1 are in the non-drive state, and the two rear wheels 2 are in the drive state; and in the simultaneous front and rear wheel drive mode, both the two front wheels 1 and the two rear wheels 2 are in the drive state.

Based on the above-mentioned drive system for an engineering vehicle, the present disclosure further proposes an engineering vehicle, which includes the above-mentioned drive system for an engineering vehicle.

Figure 3:
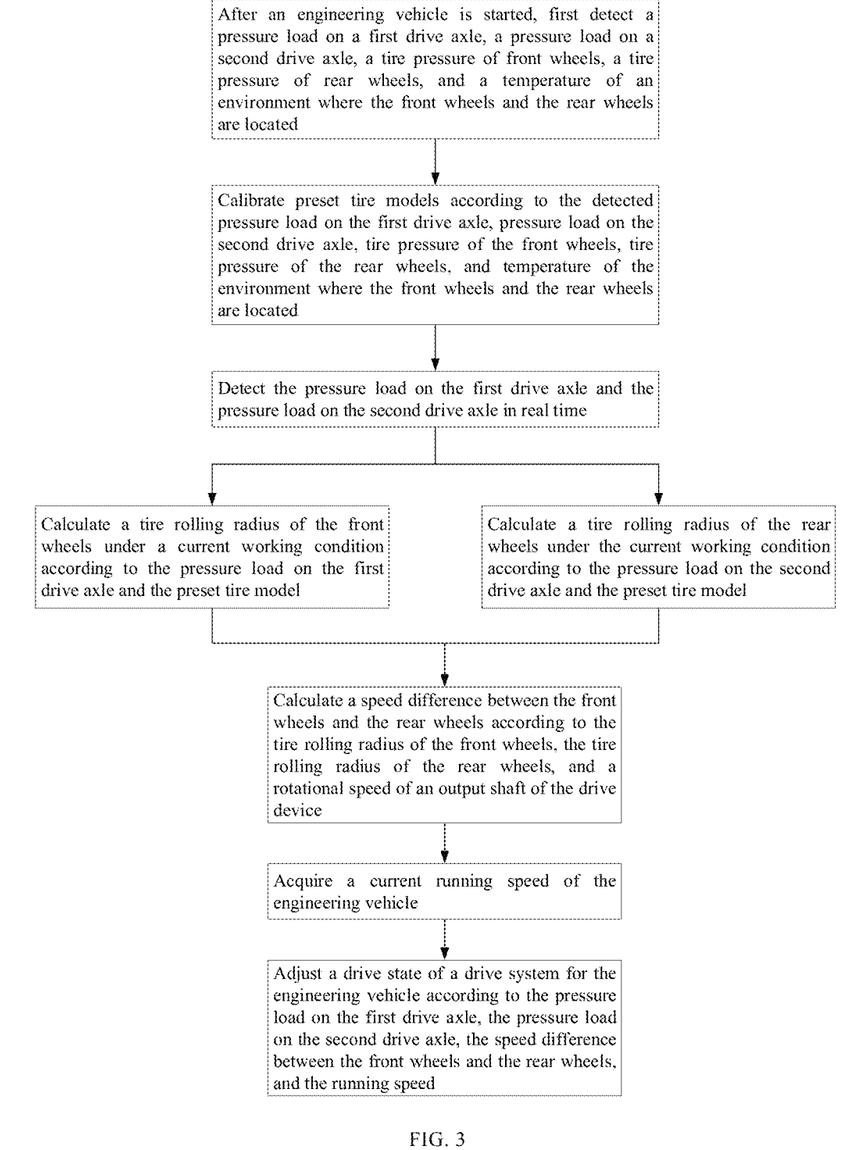
FIG. 3 is a flowchart of an embodiment of a drive system for an engineering vehicle in the present disclosure.

As shown in FIG. 3, based on the drive system for an engineering vehicle in the above-mentioned various embodiments, the present disclosure also provides a drive method for an engineering vehicle. The drive method includes:

detecting a pressure load on a first drive axle 4 and a pressure load on a second drive axle 5;

calculating a speed difference between front wheels 1 and rear wheels 2;

acquiring a running speed of the engineering vehicle; and adjusting a drive mode of the drive system for an engineering vehicle according to the pressure load on the first drive axle 4, the pressure load on the second drive axle 5, the speed difference between the front wheels 1 and the rear wheels 2, and the running speed, where the drive mode includes a front wheel drive mode, a rear wheel drive mode, and a simultaneous front and rear wheel drive mode.

In some embodiments, the calculating a speed difference between front wheels 1 and rear wheels 2 includes:

providing a preset front wheel tire model and a preset rear wheel tire model;

calculating a tire rolling radius of the front wheels 1 according to the pressure load on the first drive axle 4 and the preset front wheel tire model, and calculating a tire rolling radius of the rear wheels 2 according to the pressure load on the second drive axle 5 and the preset rear wheel tire model; and calculating the speed difference between the front wheels 1 and the rear wheels 2 according to the tire rolling radius of the front wheels 1, the tire rolling radius of the rear wheels 2, a transmission ratio of the first drive axle 4, and a transmission ratio of the second drive axle 5.

In some embodiments, after the engineering vehicle is started, and before the tire rolling radius of the front wheels 1 is calculated according to the pressure load on the first drive axle 4 and the preset front wheel tire model and the tire rolling radius of the rear wheels 2 is calculated according to the pressure load on the second drive axle 5 and the preset rear wheel tire model, the pressure load on the first drive axle 4, the pressure load on the second drive axle 5, a tire pressure of the front wheels 1, a tire pressure of the rear wheels 2, and a temperature of an environment where the front wheels 1 and the rear wheels 2 are located are detected first, and the preset front wheel tire model and the preset rear wheel tire model are calibrated according to a detection result.

In some embodiments, the acquiring a running speed of the engineering vehicle includes:

when the current drive mode of the engineering vehicle is the simultaneous front and rear wheel drive mode, if the pressure load on the first drive axle 4 is greater than or equal to the pressure load on the second drive axle 5, taking the speed of the front wheels 1 as the running speed of the engineering vehicle; and if the pressure load on the first drive axle 4 is less than the pressure load on the second drive axle 5, taking the speed of the rear wheels 2 as the running speed of the engineering vehicle;

when the current drive mode of the engineering vehicle is the front wheel drive mode, taking the speed of the front wheels 1 as the running speed of the engineering vehicle; and when the current drive mode of the engineering vehicle is the rear wheel drive mode, taking the speed of the rear wheels 2 as the running speed of the engineering vehicle.

Figure 4:
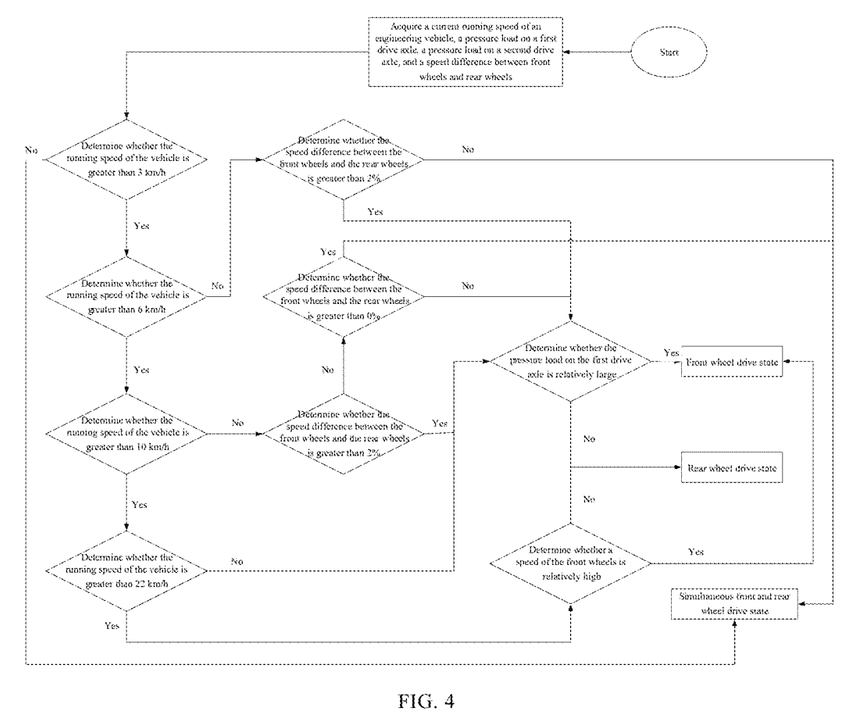
FIG. 4 is a flowchart of a drive distribution device in an embodiment of a drive system for an engineering vehicle according to the present disclosure.

As shown in FIG. 4, in some embodiments, the adjusting a drive mode of the drive system for an engineering vehicle according to the pressure load on the first drive axle 4, the pressure load on the second drive axle 5, the speed difference between the front wheels 1 and the rear wheels 2, and the running speed includes:

when the engineering vehicle is in a first running state, adjusting the drive mode of the drive system for an engineering vehicle to the simultaneous front and rear wheel drive mode;

when the engineering vehicle is in a second running state, adjusting the drive mode of the drive system for an engineering vehicle to the front wheel drive mode, the rear wheel drive mode, or the simultaneous front and rear wheel drive mode according to the speed difference between the front wheels 1 and the rear wheels 2, the pressure load on the first drive axle 4, and the pressure load on the second drive axle 5;

when the engineering vehicle is in a third running state, adjusting the drive mode of the drive system for an engineering vehicle to the front wheel drive mode or the rear wheel drive mode according to the pressure load on the first drive axle 4 and the pressure load on the second drive axle 5; and when the engineering vehicle is in a fourth running state, adjusting the drive mode of the drive system for an engineering vehicle to the front wheel drive mode or the rear wheel drive mode according to the speed difference between the front wheels 1 and the rear wheels 2;

wherein the running speed of the engineering vehicle in the first running state<the running speed of the engineering vehicle in the second running state<the running speed of the engineering vehicle in the third running state<the running speed of the engineering vehicle in the fourth running state.

In some embodiments, when the engineering vehicle is in a second running state, the adjusting the drive mode of the drive system for an engineering vehicle to the front wheel drive mode, the rear wheel drive mode, or the simultaneous front and rear wheel drive mode according to the speed difference between the front wheels 1 and the rear wheels 2, the pressure load on the first drive axle 4, and the pressure load on the second drive axle 5 includes:

when the running speed of the engineering vehicle is within a first running speed range, if the speed difference between the front wheels 1 and the rear wheels 2 is not greater than 2%, adjusting the drive mode of the drive system for an engineering vehicle to the simultaneous front and rear wheel drive mode; and if the speed difference between the front wheels 1 and the rear wheels 2 is greater than 2%, adjusting the drive mode of the drive system for an engineering vehicle to the front wheel drive mode or the rear wheel drive mode according to the pressure load on the first drive axle 4 and the pressure load on the second drive axle 5; and when the running speed of the engineering vehicle is within a second running speed range, if the speed difference between the front wheels 1 and the rear wheels 2 is greater than 2%, adjusting the drive mode of the drive system for an engineering vehicle to the front wheel drive mode or the rear wheel drive mode according to the pressure load on the first drive axle 4 and the pressure load on the second drive axle 5; if the speed difference between the front wheels 1 and the rear wheels 2 is 0-2%, adjusting the drive mode of the drive system for an engineering vehicle to the simultaneous front and rear wheel drive mode; and if the speed difference between the front wheels 1 and the rear wheels 2 is less than 0, adjusting the drive mode of the drive system for an engineering vehicle to the front wheel drive mode or the rear wheel drive mode according to the pressure load on the first drive axle 4 and the pressure load on the second drive axle 5;

wherein the speed in the first running speed range is greater than the speed in the second running speed range.

A structure and a working process of the drive system for an engineering vehicle in an embodiment of the present disclosure are described below in conjunction with FIGS. 1 to 4.

As shown in FIG. 1 and FIG. 2, the drive system for an engineering vehicle includes the front wheels 1, the rear wheels 2, the drive device 3, the first drive axle 4, the second drive axle 5, a first pressure detection device 6, the first calculation device 7, the speed acquisition device 8, the drive distribution device 9, the second calculation device 10, the rotational speed detection device 11, a second pressure detection device 12, the temperature detection device 13, a model calibration device 14, a first transmission shaft 15, and a second transmission shaft 16.

The drive device 3 includes an engine 31, a gearbox 32, and a controller 33 for controlling the gearbox 32. The first drive axle 4 is connected to a front output shaft of the gearbox 32 through the first transmission shaft 15, and the second drive axle 5 is connected to a rear output shaft of the gearbox 32 through the second transmission shaft 16. There are a first transmission ratio between the front output shaft of the gearbox 32 and the first drive axle 4 and a second transmission ratio between the rear output shaft of the gearbox 32 and the second drive axle 5. Two ends of the first drive axle 4 are respectively connected to the front wheels 1, and two ends of the second drive axle 5 are respectively connected to the rear wheels 2.

The engine 31 and the gearbox 32 provide the power for the entire vehicle, and the controller 33 controls the gearbox 32 to shift gears and provide power output for the front output shaft or the rear output shaft. Output power of the drive device 3 is respectively input to the first drive axle 4 and the second drive axle 5 through the first transmission shaft 15 and the second transmission shaft 16, and finally running is realized under drive of the two front wheels 1 and the two rear wheels 2.

The rotational speed detection device 11 is arranged inside the gearbox 32 to detect the rotational speed of the output shaft of the gearbox 32. The first pressure detection device 6 includes a first pressure sensor 61 and a second pressure sensor 62. The first pressure sensor 61 is arranged on the first drive axle 4 to detect the pressure load on the first drive axle 4; and the second pressure sensor 62 is arranged on the second drive axle 5 to detect the pressure load on the second drive axle 5.

The drive system includes two front wheels 1 and two rear wheels 2. The second pressure detection device 12 includes two third pressure sensors 121 respectively arranged on the two front wheels 1 and two fourth pressure sensors 122 respectively arranged on the two rear wheels 2. The third pressure sensors 121 are configured to detect the tire pressure of the front wheels 1, and the fourth pressure sensors 122 are configured to detect the tire pressure of the rear wheels 2.

As shown in FIG. 2, the first pressure detection device 6, the second pressure detection device 12, and the temperature detection device 13 are respectively connected to the model calibration device 14, the first pressure detection device 6, the temperature detection device 13, the rotational speed detection device 11, and the model calibration device 14 are respectively connected to the second calculation device 10, the second calculation device 10 is connected to the first calculation device 7, and the first calculation device 7 is connected to the speed acquisition device 8. The drive distribution device 9 is respectively connected to the first calculation device 7, the speed acquisition device 8, and the first pressure detection device 6 to adjust the drive mode of the drive system according to the current running speed of the vehicle, the speed difference between the front wheels and the rear wheels, the pressure load on the first drive axle 4, and the pressure load on the second drive axle 5.

The model calibration device 14 includes the preset front wheel tire model and the preset rear wheel tire model. The first calculation device 7 includes the front wheel speed calculation device 71 and the rear wheel speed calculation device 72.

In this embodiment, functional components of the drive system may be integrated into the controller of the gearbox or a vehicle controller of the vehicle. If they are integrated into the vehicle controller, an adjustment instruction for the drive mode of the vehicle may be output by the vehicle controller to the controller 33 of the gearbox, and the gearbox is controlled by the controller 33 of the gearbox to execute the adjustment instruction.

As shown in FIG. 3, a working principle of the drive system is as follows:

After the engineering vehicle is started, the tire pressure of the front wheels 1, the tire pressure of the rear wheels 2, the pressure load on the first drive axle 4, the pressure load on the second drive axle 5, and the temperature of the environment where the front wheels 1 and the rear wheels 2 are located are acquired first.

Then, the preset front wheel tire model and the preset rear wheel tire model are calibrated and updated according to the tire pressure of the front wheels 1, the tire pressure of the rear wheels 2, the pressure load on the first drive axle 4, the pressure load on the second drive axle 5, and the temperature of the environment. The calibrated and updated models may serve as a standard for subsequent queries.

The pressure load on the first drive axle 4 and the pressure load on the second drive axle 5 are acquired in real time.

The preset front wheel tire model is queried according to the pressure load on the first drive axle 4, and the tire rolling radius of the front wheels 1 under a current working condition is calculated.

The preset rear wheel tire model is queried according to the pressure load on the second drive axle 5, and the tire rolling radius of the rear wheels 2 under the current working condition is calculated.

The speed difference between the front wheels and the rear wheels is calculated according to the current tire rolling radius of the front wheels, tire rolling radius of the rear wheels, and rotational speed of the output shaft of the drive device 3.

The current running speed of the engineering vehicle is acquired in real time.

The drive mode of the drive system is adjusted according to the current speed of the vehicle, the speed difference between the front wheels and the rear wheels, the pressure load on the first drive axle 4, and the pressure load on the second drive axle 5.

When the drive mode is adjusted, a principle to follow are as follows:

First, speed identification is carried out. When the vehicle is stopped to run at a low speed, it is determined that a current actual demand is accelerated running, sufficient power output is required, and the vehicle adopts the simultaneous front and rear wheel drive mode. When the speed increases, the pressure load on the first drive axle 4 and the pressure load on the second drive axle 5 need to be determined. In general, axle load distribution of an unloaded engineering vehicle and axle load distribution of a loaded engineering vehicle are obviously different. In order to obtain the larger grip force of the tires and avoid the speed difference between the front wheels and the rear wheels, the front wheels 1 or the rear wheels 2 with a relatively large axle load will be adopted for drive. When the speed reaches a high-speed running stage, the vehicle is in a light-load or no-load condition, it is determined that the actual demand of an operator is longer-distance high-speed running, and the system will select the front wheels 1 or the rear wheels 2 with a relatively high speed for drive according to a speed comparison result of the front wheels and the rear wheels to obtain a higher running speed.

In the technical solutions of the embodiments of the present disclosure, the preset tire models are calibrated according to relevant state data of the tires of the front wheels and the rear wheels, load distribution of the front drive axle and load distribution of the rear drive axle are acquired in real time, the speed difference between the front wheels and the rear wheels is acquired by querying the tire models, and an optimal drive form is identified and determined on the basis of the current running speed of the vehicle, the speed difference between the front wheels and the rear wheels, the load distribution of the front drive axle, and the load distribution of the rear drive axle. Under the condition of ensuring the power output of the engineering vehicle, high-accuracy control can be performed according to a current operating state of the vehicle, such that a large running resistance, additional side loads of the axles, and excessive tire wear caused by the speed difference between the front wheels and the rear wheels may be effectively prevented, the fuel economy of the vehicle can be improved more effectively, and the running efficiency and reliability of the vehicle are improved.

As shown in FIG. 4, a workflow of the drive distribution device 9 is as follows.

The running speed of the vehicle, the speed difference between the front wheels and the rear wheels, and the loads of the drive axles are acquired by means of the speed acquisition device 8, the first calculation device 7, and the first pressure detection device 6 first, and then the running speed of the vehicle is determined as below.

When the running speed is not greater than 3 km/h, it is in a starting acceleration stage, and four-wheel drive is output currently.

When the running speed is 3-6 km/h, the speed difference between the front wheels and the rear wheels is determined. If the speed difference between the front wheels and the rear wheels is not greater than 2%, the running resistance is slightly influenced, the vehicle is in a loaded state, and the four-wheel drive is output currently. In this case, if the speed difference between the front wheels and the rear wheels is greater than 2%, the vehicle is in a light-load or no-load state, and a determination is made according to a load condition of the front drive axle and a load condition of the rear drive axle. If the load of the front drive axle is relatively large, front wheel drive is output; and if the load of the rear drive axle is relatively large, rear wheel drive is output.

When the running speed is 6-10 km/h, the speed difference between the front wheels and the rear wheels is also determined. If the speed difference between the front wheels and the rear wheels is greater than 2%, the vehicle is in the light-load or no-load state, and then the determination is made according to the load condition of the front drive axle and the load condition of the rear drive axle. If the load of the front drive axle is relatively large, the front wheel drive is output; and if the load of the rear drive axle is relatively large, the rear wheel drive is output. If the speed difference between the front wheels and the rear wheels is 0-2%, the running resistance is slightly influenced, the vehicle is in the loaded state, and the four-wheel drive is output currently. In this case, if the speed difference between the front wheels and the rear wheels is less than 0%, that is, when the speed of the front wheels 1 is less than the speed of the rear wheels 2, a determination is made according to the load condition of the front drive axle and the load condition of the rear drive axle. If the load of the front drive axle is relatively large, the front wheel drive is output; and if the load of the rear drive axle is relatively large, the rear wheel drive is output.

When the running speed is 10-22 km/h, the vehicle is in a medium-high-speed stage and in the light-load or no-load state. In this case, a determination is made according to the load condition of the front drive axle and the load condition of the rear drive axle. If the load of the front drive axle is relatively large, the front wheel drive is output; and if the load of the rear drive axle is relatively large, the rear wheel drive is output.

When the running speed exceeds 22 km/h, the vehicle is in a high-speed running stage, and generally is in the no-load state and needs to be rapidly transferred. In this case, a determination is made according to the speed of the front wheels and the speed of the rear wheels. If the speed of the front wheels is relatively high, the front wheel drive is output; and if the speed of the rear wheels is relatively high, the rear wheel drive is output.

The embodiment of the present disclosure effectively solves a problem of poor power performance and drive efficiency of the engineering vehicle due to a relatively large difference in load distribution of the axles and force deformation of the tires of the engineering vehicle due to frequent switching of full load and no load. The drive distribution device provided by the embodiment of the present disclosure may trigger the corresponding drive mode to realize rapid switching of the drive modes.

In the embodiments of the present disclosure, the optimal drive form is identified and determined on the basis of the current running speed of the vehicle, the speed difference between the front wheels and the rear wheels, the load distribution of the front drive axle, and the load distribution of the rear drive axle. In this way, the drive form can be automatically adjusted according to a real-time running state of the engineering vehicle. Under the condition of ensuring the power output of the engineering vehicle, the large running resistance, the additional side loads of the axles, and the excessive tire wear caused by the speed difference between the front wheels and the rear wheels are effectively prevented, and the reliability and fuel economy of the vehicle can be improved more effectively. This solution is economical, practical, simple and reliable, and effectively improves adaptability of the engineering vehicle to various working conditions and fuel efficiency of the engineering vehicle.

Finally, it should be noted that the foregoing embodiments are merely intended for describing the technical solutions of the present disclosure, but not for limiting the present disclosure. Although the present disclosure is described in detail with reference to the preferred embodiments, persons of ordinary skill in the art should understand that they may still make modifications to the specific embodiments of the present disclosure or make equivalent replacements to some technical features without departing from the principles of the present disclosure, and these modifications and equivalent replacements shall fall within the scope of the technical solutions claimed in the present disclosure.

The invention claimed is:

1. A drive system for an engineering vehicle, comprising:
   front wheels (1);
   rear wheels (2);
   a drive device (3);
   a first drive axle (4), connected between the drive device (3) and the front wheels (1);
   a second drive axle (5), connected between the drive device (3) and the rear wheels (2);
   first pressure detection device (6), configured to detect a pressure load on the first drive axle (4) and a pressure load on the second drive axle (5);
   a first calculation device (7), configured to calculate a speed difference between the front wheels (1) and the rear wheels (2);
   a speed acquisition device (8), configured to acquire a running speed of the engineering vehicle; and
   a drive distribution device (9), in signal connection with the first pressure detection device (6), the first calculation device (7), and the speed acquisition device (8), the drive distribution device (9) being configured to adjust a drive mode of the drive system for an engineering vehicle according to the pressure load on the first drive axle (4), the pressure load on the second drive axle (5), the speed difference between the front wheels (1) and the rear wheels (2), and the running speed, the drive mode comprising a front wheel drive mode, a rear wheel drive mode, and a simultaneous front and rear wheel drive mode.

2. The drive system for an engineering vehicle according to claim 1, further comprising a second calculation device (10) and a rotational speed detection device (11), the second calculation device (10) being configured to calculate a tire rolling radius of the front wheels (1) according to the pressure load on the first drive axle (4) and a preset front wheel tire model and to calculate a tire rolling radius of the rear wheels (2) according to the pressure load on the second drive axle (5) and a preset rear wheel tire model, the rotational speed detection device (11) being configured to detect a rotational speed of an output shaft of the drive device (3), the first calculation device (7) being configured to calculate the speed difference between the front wheels (1) and the rear wheels (2) according to the tire rolling radius of the front wheels (1), the tire rolling radius of the rear wheels (2), and the rotational speed of the output shaft of the drive device (3).

3. The drive system for an engineering vehicle according to claim 2, further comprising a second pressure detection device (12), a temperature detection device (13), and a model calibration device (14), the second pressure detection device (12) being configured to detect a tire pressure on the front wheels (1) and a tire pressure on the rear wheels (2), the temperature detection device (13) being configured to detect a temperature of an environment where the front wheels (1) and the rear wheels (2) are located, the model calibration device (14) being configured to calibrate the preset front wheel tire model and the preset rear wheel tire model according to the tire pressure on the front wheels (1) and the tire pressure on the rear wheels (2), detected by the second pressure detection device (12), the pressure load on the first drive axle (4) and the pressure load on the second drive axle (5), detected by the first pressure detection device (6), and the temperature of the environment where the front wheels (1) and the rear wheels (2) are located, detected by the temperature detection device (13) after the engineering vehicle is started.

4. The drive system for an engineering vehicle according to claim 1, wherein the speed acquisition device (8) is configured to acquire the running speed of the engineering vehicle according to the pressure load on the first drive axle (4), the pressure load on the second drive axle (5), a speed of the front wheels (1), a speed of the rear wheels (2), and the current drive mode of the engineering vehicle.

5. The drive system for an engineering vehicle according to claim 1, wherein the drive distribution device (9) is configured to:
   the case that the engineering vehicle is in a first running state, adjust the drive mode of the drive system for an engineering vehicle to the simultaneous front and rear wheel drive mode;
   in the case that the engineering vehicle is in a second running state, adjust the drive mode of the drive system for an engineering vehicle to the front wheel drive mode, the rear wheel drive mode, or the simultaneous front and rear wheel drive mode according to the speed difference between the front wheels (1) and the rear wheels (2), the pressure load on the first drive axle (4), and the pressure load on the second drive axle (5);
   in the case that the engineering vehicle is in a third running state, adjust the drive mode of the drive system for an engineering vehicle to the front wheel drive mode or the rear wheel drive mode according to the pressure load on the first drive axle (4) and the pressure load on the second drive axle (5); and
   in the case that the engineering vehicle is in a fourth running state, adjust the drive mode of the drive system for an engineering vehicle to the front wheel drive mode or the rear wheel drive mode according to the speed difference between the front wheels (1) and the rear wheels (2);
   wherein the running speed of the engineering vehicle in the first running state<the running speed of the engineering vehicle in the second running state<the running speed of the engineering vehicle in the third running state<the running speed of the engineering vehicle in the fourth running state.

6. The drive system for an engineering vehicle according to claim 5, wherein the drive distribution device (9) is configured to: in the case that the engineering vehicle is in the second running state:
   in the case that the running speed of the engineering vehicle is within a first running speed range, if the speed difference between the front wheels (1) and the rear wheels (2) is not greater than 2%, adjust the drive mode of the drive system for an engineering vehicle to the simultaneous front and rear wheel drive mode; and if the speed difference between the front wheels (1) and the rear wheels (2) is greater than 2%, adjust the drive mode of the drive system for an engineering vehicle to the front wheel drive mode or the rear wheel drive mode according to the pressure load on the first drive axle (4) and the pressure load on the second drive axle (5); and
   in the case that the running speed of the engineering vehicle is within a second running speed range, if the speed difference between the front wheels (1) and the rear wheels (2) is greater than 2%, adjust the drive mode of the drive system for an engineering vehicle to the front wheel drive mode or the rear wheel drive mode according to the pressure load on the first drive axle (4) and the pressure load on the second drive axle (5); if the speed difference between the front wheels (1) and the rear wheels (2) is 0-2%, adjust the drive mode of the drive system for an engineering vehicle to the simultaneous front and rear wheel drive mode; and if the speed difference between the front wheels (1) and the rear wheels (2) is less than 0, adjust the drive mode of the drive system for an engineering vehicle to the front wheel drive mode or the rear wheel drive mode according to the pressure load on the first drive axle (4) and the pressure load on the second drive axle (5);
   wherein the speed in the first running speed range is less than the speed in the second running speed range.

7. The drive system for an engineering vehicle according to claim 6, wherein in the case that the engineering vehicle is in the first running state, the running speed of the engineering vehicle is not greater than 3 km/h; in the case that the engineering vehicle is in the second running state, the first running speed range of the engineering vehicle is 3-6 km/h, and the second running speed range of the engineering vehicle is 6-10 km/h; in the case that the engineering vehicle is in the third running state, the running speed of the engineering vehicle is 10-22 km/h; and in the case that the engineering vehicle is in the fourth running state, the running speed of the engineering vehicle exceeds 22 km/h.

8. The drive system for an engineering vehicle according to claim 1, wherein the drive system for an engineering vehicle comprises the two front wheels (1) and the two rear wheels (2); in the front wheel drive mode, the two front wheels (1) being in a drive state; in the rear wheel drive mode, the two rear wheels (2) being in the drive state; and in the simultaneous front and rear wheel drive mode, both the two front wheels (1) and the two rear wheels (2) being in the drive state.

9. An engineering vehicle comprising the drive system for an engineering vehicle according to claim 1.

10. A drive method based on the drive system for an engineering vehicle according to claim 1, comprising:
    detecting a pressure load on a first drive axle (4) and a pressure load on a second drive axle (5);
    calculating a speed difference between front wheels (1) and rear wheels (2);
    acquiring a running speed of the engineering vehicle; and
    adjusting a drive mode of the drive system for an engineering vehicle according to the pressure load on the first drive axle (4), the pressure load on the second drive axle (5), the speed difference between the front wheels (1) and the rear wheels (2), and the running speed, the drive mode comprising a front wheel drive mode, a rear wheel drive mode, and a simultaneous front and rear wheel drive mode.

11. The drive method according to claim 10, wherein the calculating a speed difference between front wheels (1) and rear wheels (2) comprises:
    providing a preset front wheel tire model and a preset rear wheel tire model;
    calculating a tire rolling radius of the front wheels (1) according to the pressure load on the first drive axle (4) and the preset front wheel tire model, and calculating a tire rolling radius of the rear wheels (2) according to the pressure load on the second drive axle (5) and the preset rear wheel tire model; and
    calculating the speed difference between the front wheels (1) and the rear wheels (2) according to the tire rolling radius of the front wheels (1), the tire rolling radius of the rear wheels (2), a transmission ratio of the first drive axle (4), and a transmission ratio of the second drive axle (5).

12. The drive method according to claim 11, wherein after the engineering vehicle is started, and before the tire rolling radius of the front wheels (1) is calculated according to the pressure load on the first drive axle (4) and the preset front wheel tire model and the tire rolling radius of the rear wheels (2) is calculated according to the pressure load on the second drive axle (5) and the preset rear wheel tire model, the pressure load on the first drive axle (4), the pressure load on the second drive axle (5), a tire pressure of the front wheels (1), a tire pressure of the rear wheels (2), and a temperature of an environment where the front wheels (1) and the rear wheels (2) are located are detected first, and the preset front wheel tire model and the preset rear wheel tire model are calibrated according to a detection result.

13. The drive method according to claim 10, wherein the acquiring a running speed of the engineering vehicle comprises:
    when the current drive mode of the engineering vehicle is the simultaneous front and rear wheel drive mode, if the pressure load on the first drive axle (4) is greater than or equal to the pressure load on the second drive axle (5), taking the speed of the front wheels (1) as the running speed of the engineering vehicle; and if the pressure load on the first drive axle (4) is less than the pressure load on the second drive axle (5), taking the speed of the rear wheels (2) as the running speed of the engineering vehicle;
    when the current drive mode of the engineering vehicle is the front wheel drive mode, taking the speed of the front wheels (1) as the running speed of the engineering vehicle; and
    when the current drive mode of the engineering vehicle is the rear wheel drive mode, taking the speed of the rear wheels (2) as the running speed of the engineering vehicle.

14. The drive method according to claim 10, wherein the adjusting a drive mode of the drive system for an engineering vehicle according to the pressure load on the first drive axle (4), the pressure load on the second drive axle (5), the speed difference between the front wheels (1) and the rear wheels (2), and the running speed comprises:
    when the engineering vehicle is in a first running state, adjusting the drive mode of the drive system for an engineering vehicle to the simultaneous front and rear wheel drive mode;
    when the engineering vehicle is in a second running state, adjusting the drive mode of the drive system for an engineering vehicle to the front wheel drive mode, the rear wheel drive mode, or the simultaneous front and rear wheel drive mode according to the speed difference between the front wheels (1) and the rear wheels (2), the pressure load on the first drive axle (4), and the pressure load on the second drive axle (5);
    when the engineering vehicle is in a third running state, adjusting the drive mode of the drive system for an engineering vehicle to the front wheel drive mode or the rear wheel drive mode according to the pressure load on the first drive axle (4) and the pressure load on the second drive axle (5); and
    when the engineering vehicle is in a fourth running state, adjusting the drive mode of the drive system for an engineering vehicle to the front wheel drive mode or the rear wheel drive mode according to the speed difference between the front wheels (1) and the rear wheels (2);
    wherein the running speed of the engineering vehicle in the first running state<the running speed of the engineering vehicle in the second running state<the running speed of the engineering vehicle in the third running state<the running speed of the engineering vehicle in the fourth running state.

15. The drive method according to claim 14, wherein when the engineering vehicle is in a second running state, the adjusting the drive mode of the drive system for an engineering vehicle to the front wheel drive mode, the rear wheel drive mode, or the simultaneous front and rear wheel drive mode according to the speed difference between the front wheels (1) and the rear wheels (2), the pressure load on the first drive axle (4), and the pressure load on the second drive axle (5) comprises:
    when the running speed of the engineering vehicle is within a first running speed range, if the speed difference between the front wheels (1) and the rear wheels (2) is not greater than 2%, adjusting the drive mode of the drive system for an engineering vehicle to the simultaneous front and rear wheel drive mode; and if the speed difference between the front wheels (1) and the rear wheels (2) is greater than 2%, adjusting the drive mode of the drive system for an engineering vehicle to the front wheel drive mode or the rear wheel drive mode according to the pressure load on the first drive axle (4) and the pressure load on the second drive axle (5); and
    when the running speed of the engineering vehicle is within a second running speed range, if the speed difference between the front wheels (1) and the rear wheels (2) is greater than 2%, adjusting the drive mode of the drive system for an engineering vehicle to the front wheel drive mode or the rear wheel drive mode according to the pressure load on the first drive axle (4) and the pressure load on the second drive axle (5); if the speed difference between the front wheels (1) and the rear wheels (2) is 0-2%, adjusting the drive mode of the drive system for an engineering vehicle to the simultaneous front and rear wheel drive mode; and if the speed difference between the front wheels (1) and the rear wheels (2) is less than 0, adjusting the drive mode of the drive system for an engineering vehicle to the front wheel drive mode or the rear wheel drive mode according to the pressure load on the first drive axle (4) and the pressure load on the second drive axle (5);
    wherein the speed in the first running speed range is less than the speed in the second running speed range.

* * * * *